(12) United States Patent
Johnsen

(10) Patent No.: US 9,555,816 B2
(45) Date of Patent: Jan. 31, 2017

(54) WHEEL CHOCK APPARATUS AND METHODS OF USING THE SAME

(71) Applicant: Holland LP, Crete, IL (US)

(72) Inventor: Erik Johnsen, Cedar Lake, IN (US)

(73) Assignee: Holland, L.P., Crete, IL (US)

( * ) Notice: Subject to any disclaimer, the term of this patent is extended or adjusted under 35 U.S.C. 154(b) by 42 days.

(21) Appl. No.: 14/561,325

(22) Filed: Dec. 5, 2014

(65) Prior Publication Data

US 2015/0158505 A1 Jun. 11, 2015

Related U.S. Application Data

(60) Provisional application No. 61/912,268, filed on Dec. 5, 2013.

(51) Int. Cl.
*B60P 3/077* (2006.01)
*B61D 3/18* (2006.01)
*B61D 45/00* (2006.01)

(52) U.S. Cl.
CPC ............. *B61D 3/188* (2013.01); *B60P 3/077* (2013.01); *B61D 45/001* (2013.01)

(58) Field of Classification Search
CPC .......... B60P 3/077; B61D 3/188; B61D 45/00; B61D 45/003
USPC ........................................................ 410/30
See application file for complete search history.

(56) References Cited

U.S. PATENT DOCUMENTS

| | | |
|---|---|---|
| 2,895,569 A | 7/1959 | Nystrom |
| 4,399,893 A | 8/1983 | Switzer |
| 4,659,266 A | 4/1987 | Thelen et al. |
| 4,668,140 A | 5/1987 | Blunden |
| 4,786,223 A | 11/1988 | Crissy et al. |
| 4,804,070 A | 2/1989 | Bohler |
| 4,836,726 A | 6/1989 | Robertson et al. |
| 4,838,743 A | 6/1989 | Blunden et al. |
| 4,875,813 A | 10/1989 | Moyer et al. |
| 5,302,063 A * | 4/1994 | Winsor ................. B60P 3/077 188/32 |
| 5,437,171 A | 8/1995 | Owen |
| 5,465,814 A | 11/1995 | Ziaylek |
| 5,586,849 A | 12/1996 | Kissel et al. |
| 5,743,192 A | 4/1998 | Saxton et al. |
| 5,762,459 A | 6/1998 | Springer et al. |
| 5,908,274 A | 6/1999 | Silberman |
| 6,092,970 A | 7/2000 | Hahn et al. |
| 6,139,231 A | 10/2000 | Kissel |
| 6,164,893 A | 12/2000 | Glomot et al. |
| 6,238,163 B1 | 5/2001 | Springer et al. |
| 6,328,511 B1 | 12/2001 | Cardona |
| RE37,570 E | 3/2002 | Springer et al. |
| 6,425,465 B1 | 7/2002 | Tallman |

(Continued)

*Primary Examiner* — H Gutman

(74) *Attorney, Agent, or Firm* — Scherrer Patent & Trademark Law, P.C.; Stephen T. Scherrer; Monique A. Morneault

(57) ABSTRACT

The present invention relates to wheel chock apparatuses. Specifically, the wheel chock apparatuses of the present invention are utilized on railcars having automobile racks, known as "auto-rack railroad cars," to hold in place a tire of an automobile thereon, restricting movement of the same during railroad transport of the same. The wheel chock apparatuses comprise a base, a ramp abutment at a front end thereof, lateral restraints at a front end thereof, and a floor grating engaging mechanism at a rear end thereof.

33 Claims, 11 Drawing Sheets

(56) References Cited

U.S. PATENT DOCUMENTS

| | | |
|---|---|---|
| 6,478,525 B2 | 11/2002 | Hageman et al. |
| 6,524,053 B2 | 2/2003 | Hahn et al. |
| 6,585,211 B1 | 7/2003 | Hageman et al. |
| 6,676,360 B2 | 1/2004 | Springer et al. |
| 6,835,034 B2 | 12/2004 | Winsor |
| 6,851,523 B1 | 2/2005 | Gaster |
| 6,926,480 B2 | 8/2005 | Anderson et al. |
| 7,004,698 B1 | 2/2006 | Anderson et al. |
| 7,044,698 B2 | 5/2006 | Winsor |
| 7,128,508 B2 | 10/2006 | Anderson et al. |
| 7,150,592 B2 | 12/2006 | Anderson et al. |
| 7,632,052 B2 | 12/2009 | Tatina |
| 7,780,385 B2 | 8/2010 | Brierton |
| 7,824,138 B2 | 11/2010 | Bullock |
| 7,976,255 B2 | 7/2011 | Anderson et al. |
| 8,047,751 B2 | 11/2011 | Powers |
| 8,066,460 B2 | 11/2011 | Brierton |
| 8,083,447 B2 | 12/2011 | Anderson et al. |
| 8,096,738 B2 | 1/2012 | Anderson et al. |
| 8,152,424 B2 | 4/2012 | Anderson et al. |
| 8,272,818 B2 | 9/2012 | Anderson et al. |
| 8,348,562 B2 | 1/2013 | Bullock |
| 8,419,326 B2 | 4/2013 | Anderson et al. |
| 8,434,977 B2 | 5/2013 | Anderson et al. |
| 8,491,238 B2 | 7/2013 | Winsor |
| 8,499,897 B2 | 8/2013 | Brooks et al. |
| 8,506,217 B2 | 8/2013 | Anderson et al. |
| 8,562,264 B2 | 10/2013 | Winsor |
| 8,714,375 B2 * | 5/2014 | Peach ........................ B60P 3/08 211/106 |
| 2008/0232919 A1 * | 9/2008 | Anderson ............... B61D 3/188 410/30 |
| 2009/0035088 A1 * | 2/2009 | Powers ..................... B60T 3/00 410/30 |
| 2009/0189046 A1 * | 7/2009 | Winsor ................... B60P 3/077 248/346.03 |
| 2009/0194375 A1 | 8/2009 | Anderson et al. |
| 2011/0236149 A1 * | 9/2011 | Anderson ............... B61D 3/188 410/30 |
| 2011/0236151 A1 * | 9/2011 | Anderson ............... B61D 3/188 410/30 |
| 2012/0080576 A1 * | 4/2012 | Winsor ................... B60P 3/077 248/346.03 |
| 2012/0097624 A1 * | 4/2012 | Peach ........................ B60P 3/08 211/49.1 |
| 2012/0163938 A1 * | 6/2012 | Anderson ............... B61D 3/188 410/30 |
| 2014/0197122 A1 * | 7/2014 | Peach ........................ B60P 3/08 211/106 |
| 2015/0360701 A1 * | 12/2015 | Johnsen ................. B61D 3/188 410/30 |

* cited by examiner

WHEEL CHOCK APPARATUS AND METHODS OF USING THE SAME

The present disclosure and embodiments disclosed herein claim priority under 35 U.S.C 119 to U.S. Provisional Patent Application No. 61/912,268, titled "Wheel Chock Apparatus and Methods of Using the Same", filed Dec. 5, 2013, which is incorporated by reference in its entirety.

TECHNICAL FIELD

The present invention relates to wheel chock apparatuses. Specifically, wheel chocks are utilized on railcars having automobile racks, known as "auto-rack railroad cars," to hold in place a tire of an automobile thereon, restricting movement of the same during railroad transport of the same.

BACKGROUND

Auto-rack railroad cars have been utilized for many years to transport automobiles, light trucks, and other like vehicles over great distances via the railroads. Specifically, the auto-rack railroad car generally is compartmentalized, having at least one level, but in many cases two or three levels, where automobiles may be parked for transport of the same. Typically, to protect the automobiles transported therein, auto-rack railroad cars typically have mesh-type or perforated side panels and a roof thereover. Doors for loading and unloading of vehicles are typically found on opposite ends thereof. The levels on which the vehicles sit are typically decks containing a means for securing the vehicles to the decks. An example of a deck for this purpose is a metal floor grating system, and the vehicles' wheels typically rest on the decks. The present invention comprises apparatuses for securing vehicle wheels to the metal floor grating systems.

Auto-rack railroad cars provide an effective and efficient way to transport large numbers of vehicles from one location to another. However, a problem associated with auto-rack railroad cars is the potential for damage to automobiles transported therein or the auto-rack railroad cars themselves. For instance, an automobile that is not secured within the auto-rack railroad car may move during transport, contacting other automobiles, the side panels, or the ends of the car, causing damage to the automobile and, perhaps, other automobiles as well.

Typically, automobiles are secured to the metal floor grating system via mechanisms designed to restrict movement of the tires of the automobiles. For example, chains with winches and ratchets may be used as tie-downs to attempt to secure the automobiles' tires to the deck thereof. However, tie-downs may be prone to failure, are often difficult and time-consuming to set up, and have the potential to damage vehicles. A need, therefore, exists for an automobile restraint system that is easy to set-up and robust to prevent movement of automobiles in auto-rack railroad cars without failing.

Other mechanisms developed to restrict tire movement in auto-rack railroad cars include various types of wheel chocks that may be placed abutting the vehicles' tires. Typically, these wheel chocks are placed adjacent to said vehicles' tires, disposed on a deck of the auto-rack railroad cars to anchor the same to prevent movement of the automobiles' tires during transport.

Typically, however, these wheel chocks are difficult to set up. Specifically, wheel chocks are relatively large and heavy apparatuses that are difficult to carry or otherwise move and operate by a user. Often, users must place the wheel chocks in proper positioning within tight confines, such as within auto-rack railroad cars after the cars are full of automobiles. A need, therefore, exists for wheel chock apparatuses and methods of using the same that are easy to manually move and manipulate to place in proper locations to engage the tires of automobiles.

Moreover, in many cases the wheel chocks are placed on the decks of the auto-rack railroad cars and are configured to engage the metal floor grating system. However, it is often difficult for a user to properly align the wheel chocks in a manner to properly engage the metal floor grating system. In addition, it is often difficult for a user to clamp onto the metal grating system after alignment thereof, often requiring manual manipulation of a complicated clamping system. A need exists, therefore, for a wheel chock apparatus and methods of using the same that easily clamps to a metal grating system of a deck in an auto-rack railroad car.

Relatedly, it is often difficult to remove a wheel chock from a deck once disposed thereon for restricting an automobile. Often, a user must manually release the wheel chock from the deck, and doing so may be relatively complicated. In addition, while one typically wants a wheel chock to maintain its connection to a deck during transport of automobiles, it is often difficult to release the wheel chock when the same must be removed for removal of the automobile from the auto-rack railroad car. A need, therefore, exists for wheel chock apparatuses and methods of using the same that may be easily released from the deck of an auto-rack railroad car by a user thereof.

To restrict movement of automobile tires laterally when placed within auto-rack railroad cars, wheel chocks typically have lateral restraint bars that typically extend from the base of the wheel chock and engage the side of the automobile tire, with the wheel chock disposed either in front of or behind the automobile tire. Known wheel chocks are typically designated as either fitting on either an automobile tire's right side or left side, depending on the alignment of the wheel chock adjacent the automobile tire. This is so because typical wheel chocks only include a single lateral restraint bar, either on a right side of the wheel chock or the left side of the wheel chock. Therefore, a user must determine which wheel chock to use in a given situation. A need, therefore, exists for wheel chock apparatuses and methods of using the same that may be used whether the user wishes to restrain a vehicle's tire on the left or right side thereof, and further that a user thereof is not required to determine whether the wheel chock fits in a given situation.

SUMMARY OF THE INVENTION

The present invention relates to wheel chock apparatuses. Specifically, the wheel chock apparatuses of the present invention are utilized on railcars having automobile racks, known as "auto-rack railroad cars," to hold in place a tire of an automobile thereon, restricting movement of the same during railroad transport of the same.

To this end, in an embodiment of the present invention, a wheel chock apparatus is provided. The wheel chock apparatus comprises a base, a front end and a rear end, wherein disposed on a rear end thereof is a deck clamping system comprising a lever, said lever causing teeth to engage a metal floor grating system when said lever is moved to a locking position, and to disengage the metal floor grating system when said lever is moved to an unlocking position.

In an alternate embodiment of the present invention, a wheel chock apparatus is provided. The wheel chock apparatus comprises a base, a front end and a rear end, wherein disposed on the front end is a rotatable tire-engagement ramp abutment, and first and second lateral restraint arms, said first lateral restraint arm disposed on a first side of the base and the second lateral restraint arm disposed on a second side of the base. In an alternate embodiment, the first and second lateral restraint arms have an extended position and a retracted position, wherein the first and second lateral restraint arms have a first lock that locks the first and second lateral restraint arms into an extended position and a second lock that locks the first and second lateral restraint arms into a retracted position.

It is, therefore, an advantage and objective of the present invention to provide an automobile restraint system that is simple in design, easy to set-up and robust to prevent movement of automobiles in auto-rack railroad cars without failing.

In addition, it is an advantage and objective of the present invention to provide wheel chock apparatuses and methods of using the same that are easy to manually move and manipulate to place in proper locations to engage the tires of automobiles.

Moreover, it is an advantage and objective of the present invention to provide wheel chock apparatuses and methods of using the same that easily clamp to a metal grating system of a deck in an auto-rack railroad car.

Further, it is an advantage and objective of the present invention to provide wheel chock apparatuses and methods of using the same that may be easily released from the deck of an auto-rack railroad car by a user thereof.

And, it is an advantage and objective of the present invention to provide lateral restraints on wheel chock apparatuses that maintain their position to prevent lateral movement of automobiles when restrained within auto-rack railroad cars during transport of the same.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to wheel chock apparatuses. Specifically, wheel chocks are utilized on railcars having automobile racks, known as "auto-rack railroad cars," to hold in place a tire of an automobile thereon, restricting movement of the same during railroad transport of the same.

Figure 1A:
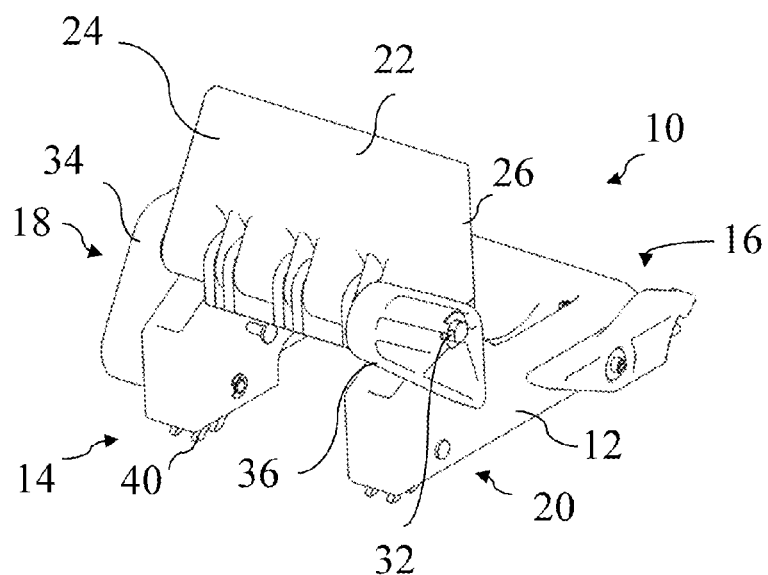
FIGS. 1A-1C illustrate various views of a wheel chock apparatus in an embodiment of the present invention.
Figure 1B:
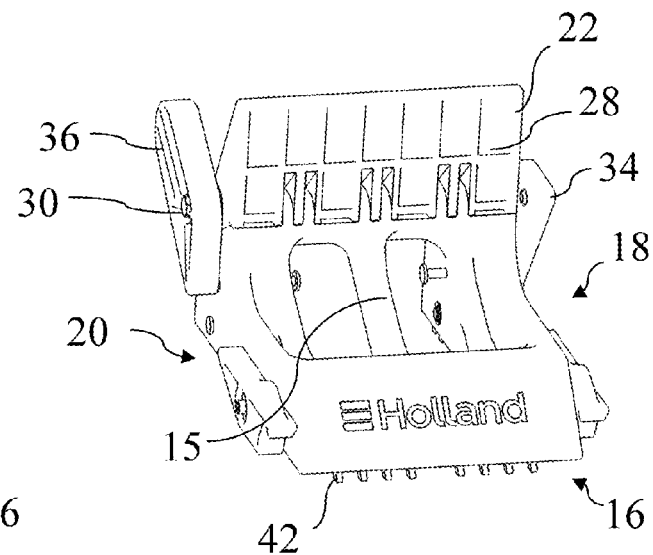

Now referring to the figures, wherein like numerals refer to like parts, FIG. 1 illustrates a wheel chock apparatus 10 in an embodiment of the present invention. The wheel chock apparatus 10 comprises a main body portion 12 having a front end 14 and a rear end 16, with a right side 18 and left side 20, based on its orientation looking from the rear end 16 to the front end 14. The wheel chock apparatus 10 may be made from a relatively lightweight polymeric material, such as a reinforced plastic and may further have a hollow construction so that the wheel chock apparatus 10 may be relatively lightweight and easy to carry and manipulate by a user. A handle 15 also functioning as a structural reinforcing member may be disposed at a balanced midpoint in the wheel chock apparatus 10 to allow a user to easily grasp the wheel chock apparatus 10, lift the same and maneuver into proper position as desired by the user. Of course, it should be noted that the wheel chock apparatus 10, and the various components thereof, may be made from any material apparent to one of ordinary skill in the art for rigidity and strength, and the present invention should not be limited as described herein.

Figure 2:
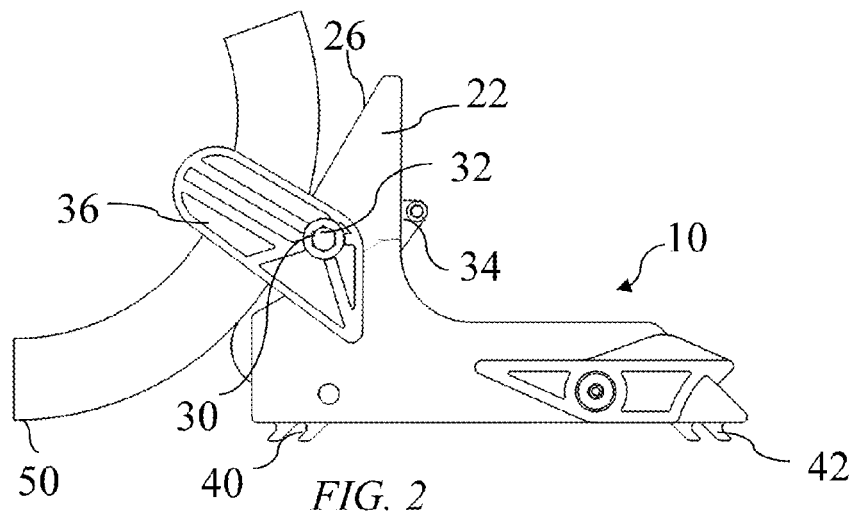
FIG. 2 illustrates a wheel chock apparatus engaging a vehicle tire to restrict movement of the same in an embodiment of the present invention.

The wheel chock may further comprise a rotatable ramp abutment 22 disposed on or in proximity to the front end 14 that may have a first ramp side 24 and a second ramp side 26, a third side 28, and an axis of rotation 30 for rotating the ramp abutment 22. The ramp abutment 22 may generally be a triangular-shaped piece, in cross section, with the first ramp side 24, the second ramp side 26 and the third side 28 forming the three sides of the triangular-shaped piece, that may rotate roughly at or in proximity to the corner between the first ramp side 24 and the third side 28. In practice, the first ramp side 24 and the second ramp side 26 may alternately rotate to face forwardly depending on whether the ramp abutment must contact a vehicle's tire at a lower position or at an upper position. Specifically, if the first side 24 of the wheel chock apparatus 10 is faced toward the front end 14 of the wheel chock apparatus 10, then the wheel chock apparatus 10 may engage a vehicle's tire at a relatively high position. Likewise, if the second side 26 of the wheel chock apparatus 10 is faced toward the front end 14 of the wheel chock apparatus 10, then the wheel chock apparatus 10 may engage a vehicle's tire at a relatively low position. In addition, the rotating ramp 22 may also allow the ramp 22 to be rotated so that the ramp 22 minimally protrudes when stored. Specifically, the wheel chock apparatus 10 of the present invention may be stored on the side wall of the auto-rack railroad car, and ramp 22 may be rotated so that the ramp does not interfere with vehicles as they are loading and/or unloading from the car. FIG. 2 illustrates the wheel chock apparatus 10 having the second surface 26 exposed forwardly and engaging a vehicle's tire 50 relatively low. As illustrated, the abutment ramp 22 may rotate about axis 30 to expose the first surface 24 (not shown in FIG. 2).

The axis 30 may comprise bolts 32 that may be disposed through a threaded rod (not shown) on the right and left sides thereof. The threaded rod may be positioned through portions of the base 12 and through portions of the ramp abutment 22 so that the ramp abutment 22 is rotatable as described above. The bolts 32 may also hold in place a pair of lateral restraints 34, 36, disposed and rotatably held, respectively, on the right and left sides 18, 20, of the wheel chock apparatus 10. The lateral restraints may be rotated to restrain a vehicle's tire 50, as illustrated in FIG. 2, and may be placed next to the sides of the vehicle's tire 50.

Figure 1C:
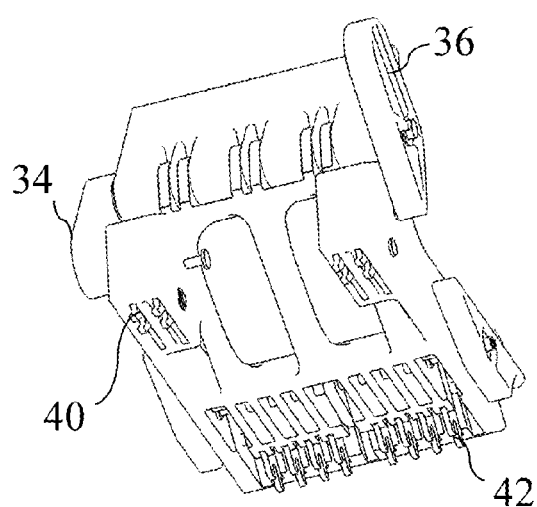

Referring to FIG. 1C, the wheel chock apparatus 10 may further comprise front engaging teeth 40 disposed beneath the front end 14 of the wheel chock apparatus 10 and rear engaging teeth 42 disposed beneath the rear end 16 of the wheel chock apparatus 10. The front engaging teeth 40 may be static and may engage a floor grating system in decks that are typically used in auto-rack railroad cars. The rear engaging teeth 42 may be extendable and retractable, as shown in more detail below, to lock the rear engaging teeth, and hence the wheel chock apparatus 10 into the deck so as to be immovable when the ramp abutment 22 is adjacent to a vehicle's tire 50. For example, the front engaging teeth 40 may be angled forwardly to hold the wheel chock apparatus in lateral bars of the floor grating system in proximity to the front end 14 of the wheel chock apparatus 10, and the rear engaging teeth 42 may be angled rearwardly to hold the wheel chock apparatus in lateral bars of the floor grating system in proximity to the rear end 16 of the wheel chock apparatus 10. Mechanisms to extend or retract the rear engaging teeth 42 are illustrated with reference to FIGS. 8-15E, and described in more detail below.

Figure 3:
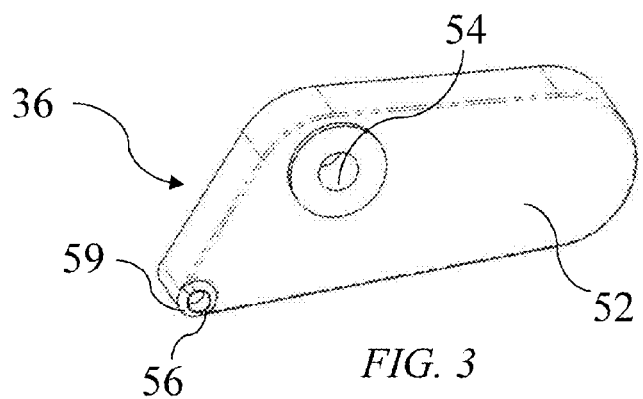
FIG. 3 illustrates a lateral restraint in an embodiment of the present invention.

FIG. 2 illustrates lateral restraint 36, disposed on the left side 20 of the wheel chock apparatus. Referring now to FIG. 3, a reverse view of the lateral restraint 36 is illustrated, which may be disposed on the left side 20 of the wheel chock apparatus 10. The lateral restraint 36 may have a body portion 52, an axis aperture 54 and a locking pin receptacle 56 therein. Lateral restraints 34, 36 may be substantially identical, although reversed in configuration, so as to be disposed on opposite sides of the wheel chock apparatus, as illustrated in FIG. 2. Therefore, although only the lateral restraint 36 is shown in FIG. 3, it should be noted that the disclosure provided herein applies equally to lateral restraint 34.

Figure 4:
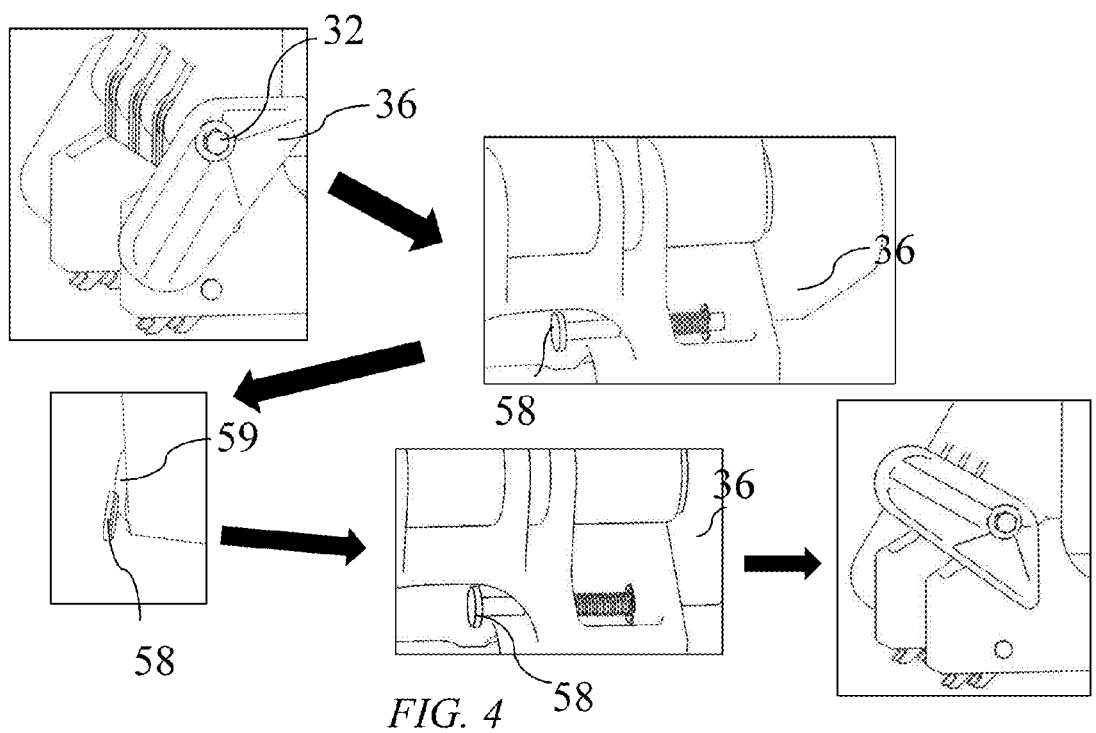
FIG. 4 illustrates a wheel chock apparatus with a lateral restraint illustrating movement of the lateral restraint in an embodiment of the present invention.

The lateral restraints 34, 36 may be rotatably attached to the body 12 of the wheel chock apparatus via the bolts 32 that may be disposed through the axis aperture 54. Therefore, as illustrated in FIG. 4 (which illustrates lateral restraint 36), the first and second lateral restraints 34, 36 may be rotated into an extended position (with the body 52 of the lateral restraint disposed on a side of a vehicle's tire 50) or a retracted position (with the body 52 of the lateral restraint disposed aside the base 12 of the wheel chock apparatus 10).

Figure 5:
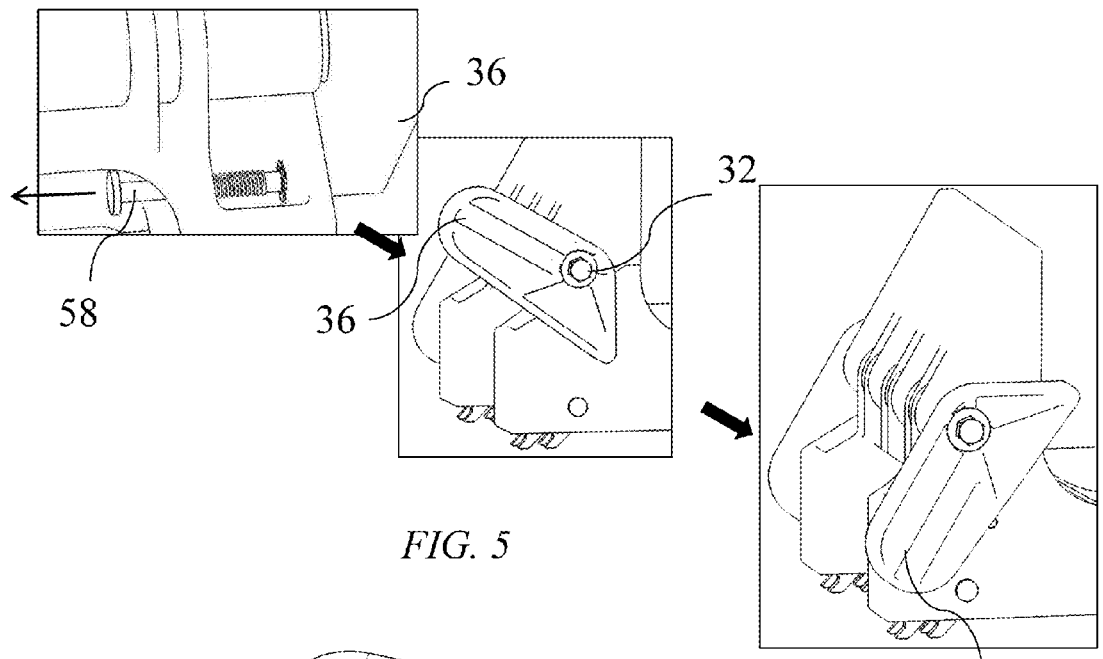
FIG. 5 illustrates a wheel chock apparatus and movement of a lateral restraint in an embodiment of the present invention.

Because the lateral restraints 34, 36 are relatively freely rotatable, a pin-locking receptacle 56 may be provided therein for engaging a spring-loaded pin 58 that may extend from the base 12 of the wheel chock apparatus 10. As illustrated in FIG. 4, in an embodiment, when the lateral restraint 36 is rotated to the extended position, the spring-loaded pin 58 may engage the pin-locking receptacle 56 on the lateral restraint, thereby locking the lateral restraint into the extended position. Therefore, the lateral restraint may be locked astride the vehicle tire 50 when extended. When a user determines to release the lateral restraint, the spring-loaded pin 58 may be pulled to disengage from the pin from the pin-locking receptacle 56, and the lateral restraint may then be freely rotatable back to the retracted or inactive position, as illustrated in FIG. 5.

The pin-locking receptacle 56 may optionally have a chamfered or rounded edge 59, such that the chamfered or rounded edge 59 may cause the pin 58 to be pushed back prior to engaging the pin-locking mechanism. This may provide resistance by a user as the user attempts to lock the lateral restraint into the extended position, as described above. Therefore, the lateral restraint may resist being locked until desired by a user, such that the lateral restraint will only be locked when the user wishes it. In other words, the chamfered edge 59 may prevent unwanted locking of the lateral restraint into the extended position when freely rotated until desired by the user.

Figure 6:
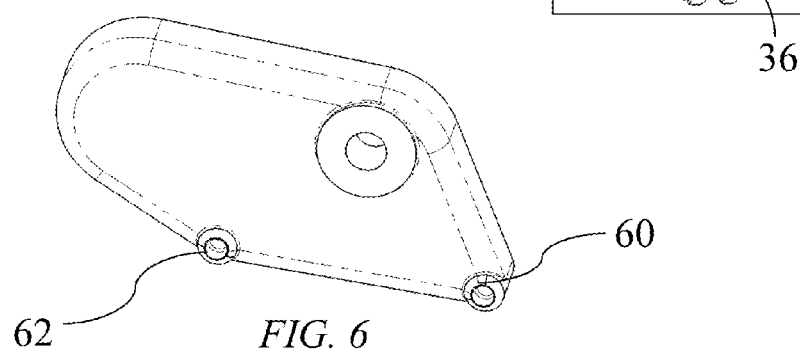
FIG. 6 illustrates a lateral restrain in an embodiment of the present invention.
Figure 7A:
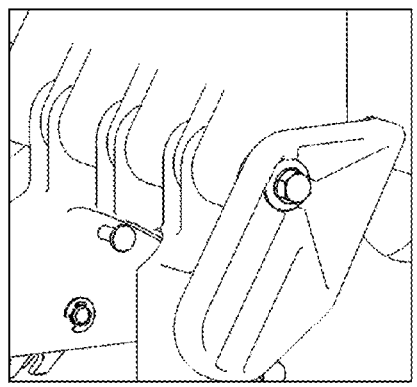
FIGS. 7A-7B illustrate extension and retraction of a lateral restraint in an embodiment of the present invention.
Figure 7B:
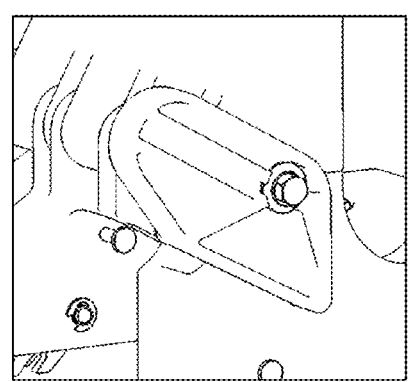

In an embodiment of the present invention, illustrated in FIGS. 6 and 7A, 7B, the lateral restraints 34, 36 may alternately have two pin-locking receptacles: an extended pin-locking receptacle 60 and a retracted pin-locking receptacle 62. Therefore, the lateral restraints may be locked, as described above, in the extended or active positions, but also in the retracted or passive positions, as illustrated in FIGS. 7A (retracted) and 7B (extended). Again, the pin-locking receptacles 60, 62 may further have optional chamfered or rounded edges that may be raised relative to the surface of the lateral restraints to prevent unwanted locking in the extended or retracted positions.

Figure 8:
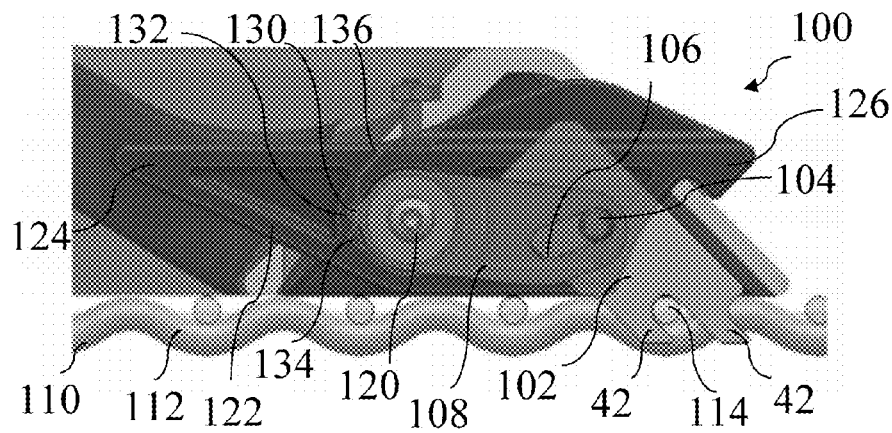
FIG. 8 illustrates a side view teeth-engaging mechanism in an embodiment of the present invention.
Figure 9:
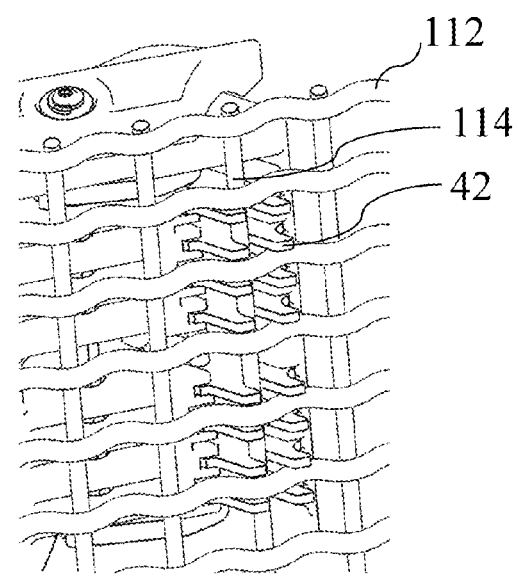
FIG. 9 illustrates an upward looking view from beneath a floor grating system illustrating engagement of a teeth-engaging mechanism with the floor grating system in an embodiment of the present invention.
Figure 10:
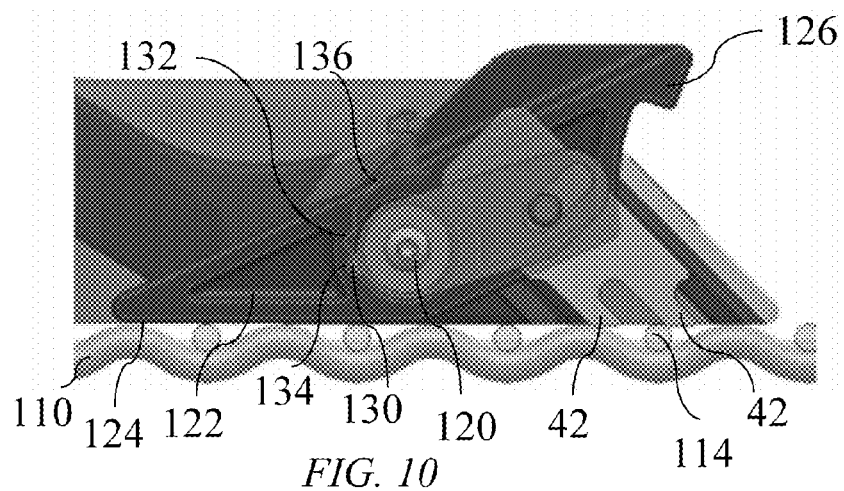
FIG. 10 illustrates a side view of a teeth-engaging mechanism in a disengaged position in an embodiment of the present invention.

Referring now to FIG. 8, a teeth-engaging mechanism 100 is illustrated, in an embodiment of the present invention. The teeth-engaging mechanism 100 generally allows a user to extend the rear engaging teeth 42 with the floor grating system 110, as illustrated in FIGS. 8 and 9 or, alternatively, to a storage plate that may be used to store the wheel chock apparatus 10 when not in use. The floor grating system 110 may typically have a plurality of longitudinally arranged undulating bars 112, joined with a plurality of straight lateral bars 114. The rear engaging teeth 42 (as well as the front engaging teeth 40) preferably engage the straight lateral bars 114 to hold the wheel chock apparatus 10 in place when utilized to restrict a vehicle's tire.

As illustrated in FIG. 8, the teeth-engaging mechanism may comprise an extending rack of teeth 102 that may extend from the rear end 16 of the wheel chock apparatus. Specifically, the extending rack of teeth 102 may angularly extend downwardly so as to engage the lateral bar 114 to lock the teeth in place. The extending rack of teeth 102 may have a bar or shaft 104 extending therefrom that may engage a slot 106 within a rotatable arm 108. The rotatable arm 108 may rotate around an axis of rotation 120 and may be linked to a lever 122 that may also rotate about the axis of rotation 120. The lever 122 may have a handle portion 124 that may be grasped by a user for moving the lever up or down, thereby engaging the teeth 42 with the floor grating system 110 (when the handle portion 124 moves upwardly) or disengaging the teeth 42 from the floor grating system 110 (when the handle portion 124 moves downwardly).

Further, the lever 122 may have a kick flange portion 126 allowing a user to either step down upon with his or her foot to engage the rear engaging teeth 42 with the floor grating system 110, or to hook his or her foot thereunder to pull upwardly on the kick flange portion 126 to disengage the rear engaging teeth 42 from the floor grating system. It should be noted that the handle portion 124 may be sized and shaped, and may have stops engaged thereto, so that the lever 122 may stop its rotation when the rear engaging teeth 42 are either fully engaged or fully disengaged. The stops prevent over-extending the lever, which may cause damage to the wheel chock apparatus 10.

The rotatable arm 108 may further have a nub 130 extending therefrom that may rotate with the arm 108 when the arm rotates. The nub 130 may engage first or second receptacles 132, 134 of a leaf spring 136, thereby providing a locking mechanism for the rotatable arm 108 and, hence, the rear engaging teeth 42. When the rotatable arm 108 rotates to engage the teeth 42 with the floor grating system 110, the nub 130 may lock into an engaged position, when disposed within first receptacle 132. Alternatively, when the rotatable arm rotates to disengage the teeth 42 from the floor grating system 110, the nub may lock into a disengaged position, when disposed within the second receptacle 134. Although the present invention is described with reference to the nub 130 and the leaf spring 136, it should be noted that the present invention may be implemented without the leaf spring 136, as the engagement of the teeth and the mechanical positions of the rotatable arm 108 and the lever 122 may be sufficient to lock the engaged teeth 42 in place on the floor grating system 110.

Figure 11:
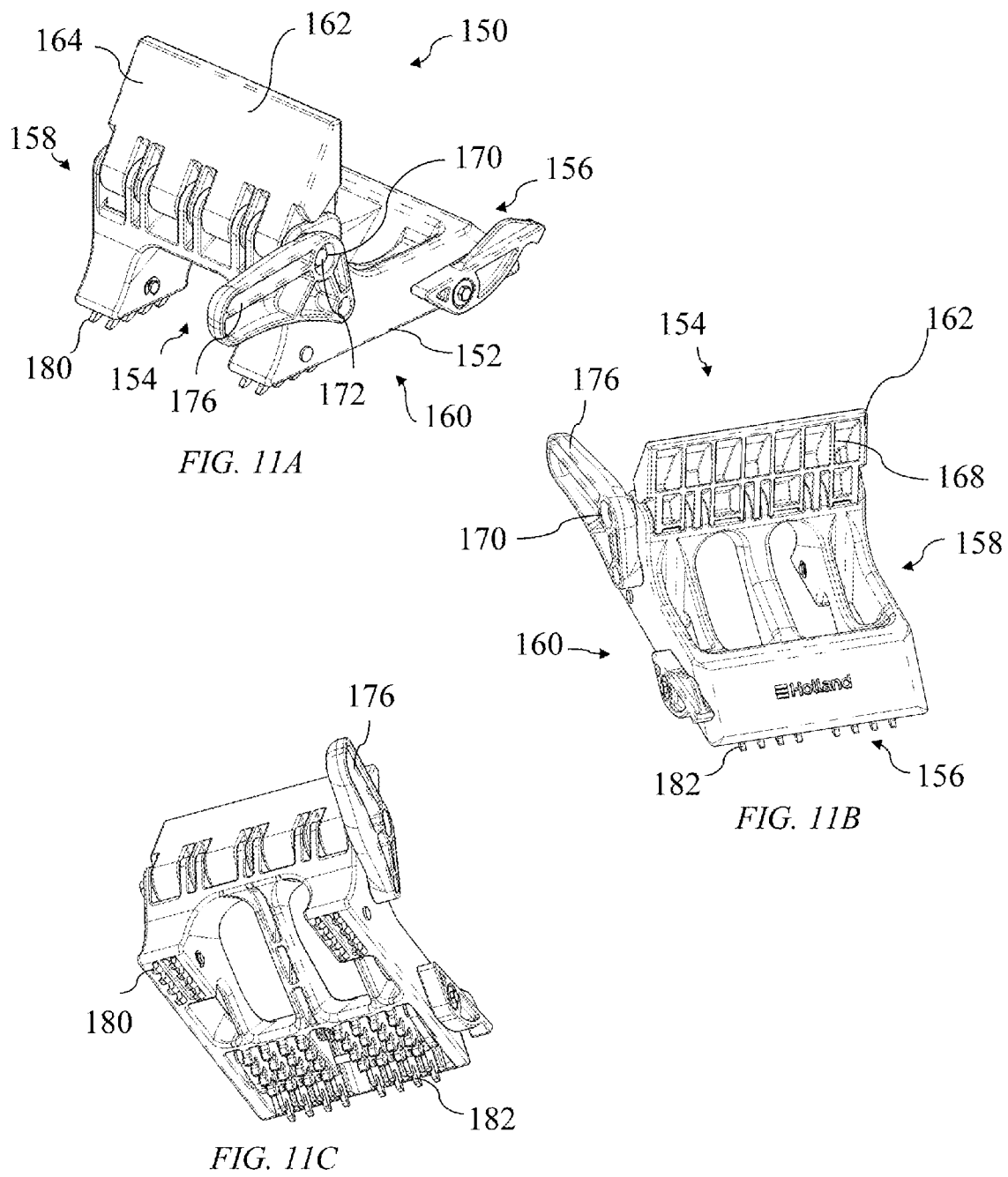
FIGS. 11A-11C illustrate various views of a wheel chock apparatus in an embodiment of the present invention.

In an embodiment of the present invention, illustrated in FIGS. 11A-16, a wheel chock apparatus 150 is shown and described. The wheel chock apparatus 150 comprises a main body portion 152, a front side 154 and a rear side 156. Further, the main body portion has a right side 158 and a left side 160, based on its orientation when viewed looking from the rear end 156 to the front end 154. The main body portion 152 may further comprise a rotatable ramp abutment 162 disposed on or in proximity to the front end 154 that may have a first ramp side 164 and a second ramp side 166, a third side 168, and an axis of rotation 170 formed from bolt 172 for rotating the ramp abutment 162. Generally, the rotatable ramp abutment 162 may be similar to the ramp abutment 22 described above with reference to FIG. 1. A lateral restraint 176 may be disposed on a side of the wheel chock apparatus main body portion 152. As shown in FIGS. 11A-11C, the lateral restraint 176 may be disposed on a left side 160 of the wheel chock apparatus 150, although it should be noted that the lateral restraint 176 may be provided on the right side thereof as well, and the present invention should not be limited as described herein. Moreover, the lateral restraint 176 may be fixed in place, and not rotatable in contrast to the embodiment described above with respect to FIG. 1. Thus, the lateral restraint 176 may be extended at all times.

Figure 12:
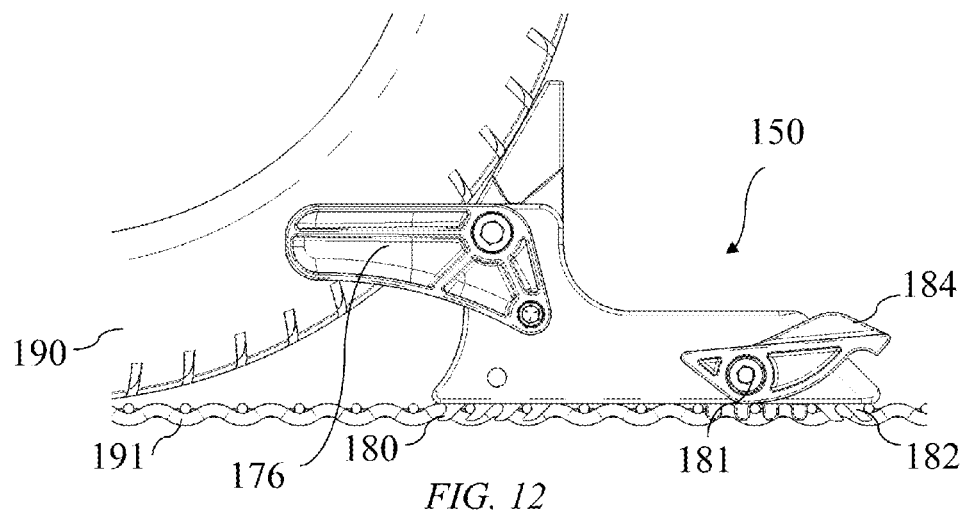
FIG. 12 illustrates a side view of a wheel chock apparatus engaging a vehicle tire in an embodiment of the present invention.

A plurality of teeth 180 may extend from the main body portion 152 of the wheel chock apparatus 150 to engage a grating system at the front end 154 of the wheel chock apparatus 150, as described above with respect to FIG. 1 with reference to teeth 40. As illustrated in FIG. 11B, a plurality of teeth 182 may extend from the rear end 156 of the wheel chock apparatus 150 for engaging a grating system at the rear end 156 of the wheel chock apparatus 150. When engaged to a grating system 191 at both the front end 154 and the rear end 156 of the wheel chock apparatus 150, as illustrated in FIG. 12, the wheel chock apparatus 150 is effectively immobilized, and when placed adjacent a vehicle tire 190, as illustrated in FIG. 12, provides an effective restraint for the tire 190 and, thus, the vehicle when utilized in an auto-rack railcar.

Figure 13:
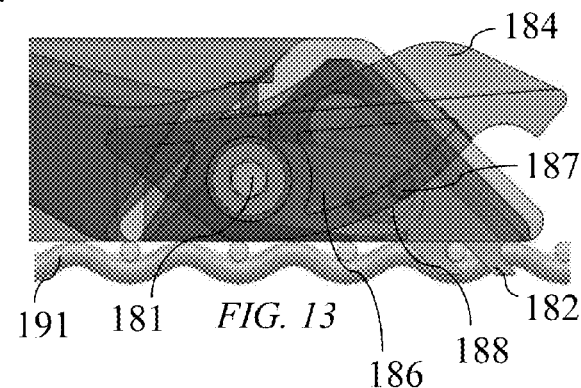
FIG. 13 illustrates a side phantom view of a wheel chock apparatus engaging a grating in an embodiment of the present invention.

FIGS. 13-16 illustrate a teeth engaging mechanism for extending and retracting teeth 182 contained within the main body portion 152 of the wheel chock apparatus. As illustrated in FIG. 13, a lever 184 may be disposed on a side of the main body portion 152 of the wheel chock apparatus 150. In a preferred embodiment, the lever 184 is on the same side of the wheel chock apparatus main body portion 152 as the lateral restraint 176, although the present invention should not be so limited, and either the lever 184 and/or the lateral restraint 176 may be disposed on either side or opposite sides of the wheel chock apparatus main body portion 152. Further, in a preferred embodiment, a first wheel chock apparatus may have both the lever 184 and the lateral restraint 176 on a right side of the wheel chock apparatus and a second wheel chock apparatus may have both the lever 184 and the lateral restraint 176 on the left side of the wheel chock apparatus, and a user of the same may select which wheel chock apparatus to use based on the needs at any specific moment.

For example, a user may wish to use a wheel chock apparatus having both the lateral restraint 176 and the lever 184 on the right side if it is easier to utilize in that position and/or if it is necessary to have the lateral restraint 176 on that side of the wheel chock apparatus and, thus, the vehicle tire. Likewise, a user may wish to use a wheel chock apparatus having both the lateral restraint 176 and the lever 184 on the left side if it is easier to utilize in that position and/or if it is necessary to have the lateral restraint 176 on that side of the wheel chock apparatus and, thus, the vehicle tire. The wheel chock apparatuses having the lateral restraint 176 and the lever 184 on the right side may be differently colored, or have a portion thereof differently colored, then the wheel chock apparatuses having the lateral restraint 176 and the lever 184 on the left side to more easily distinguish the two types of wheel chock apparatuses.

Figure 14:
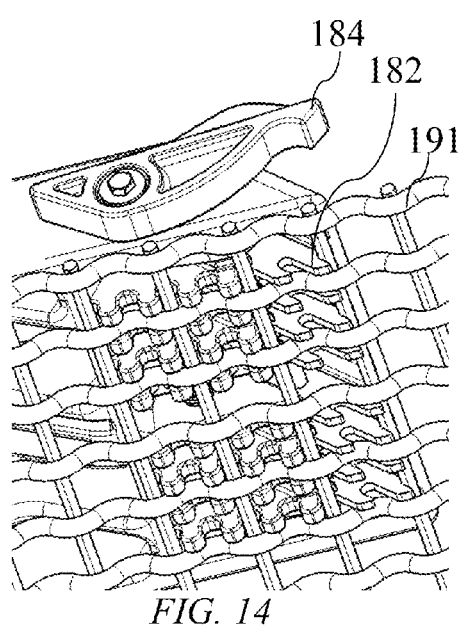
FIG. 14 illustrates a bottom view of a wheel chock apparatus engaging a grating in an embodiment of the present invention.
Figure 16:
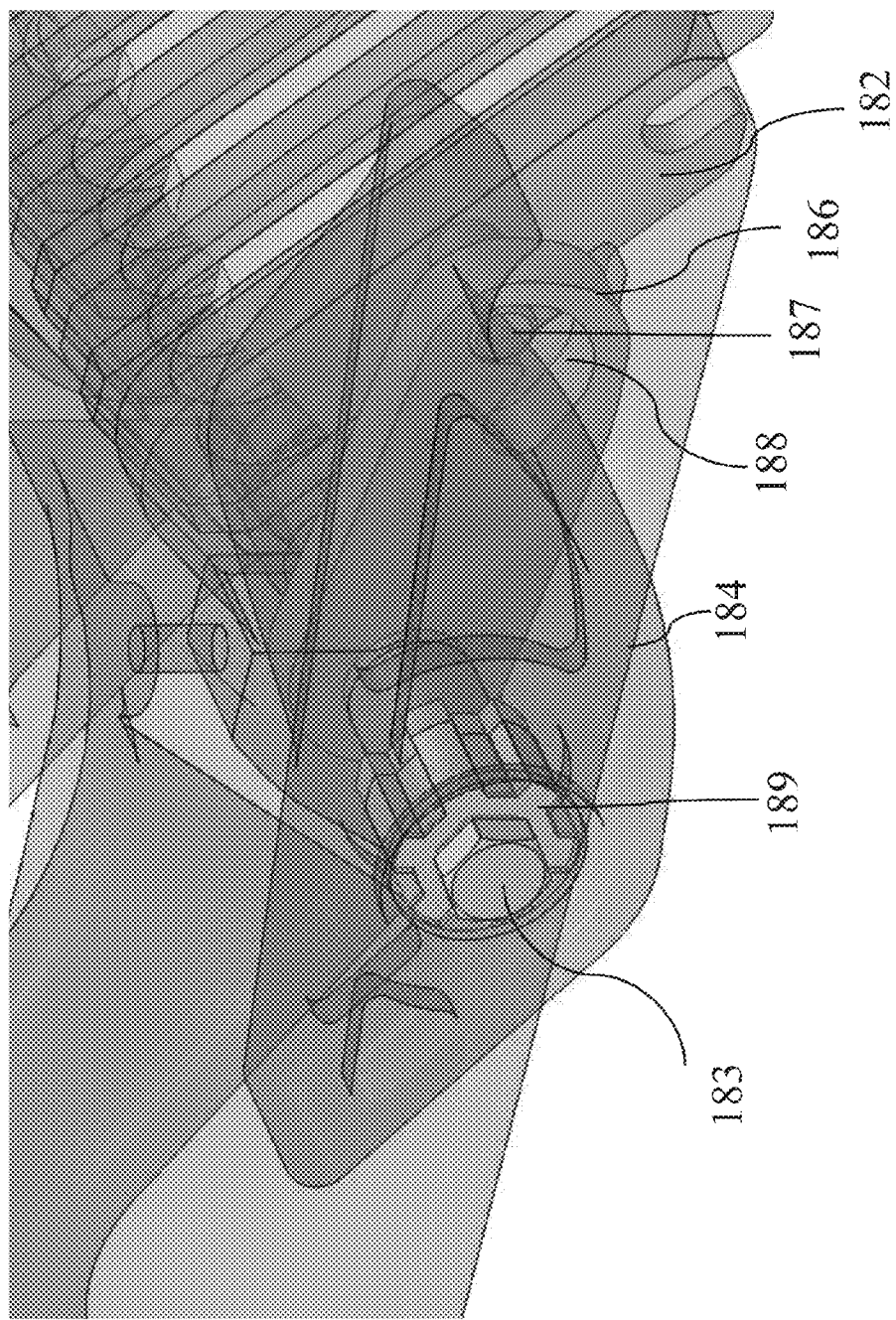
FIG. 16 illustrates a side phantom perspective view of a wheel chock apparatus in an embodiment of the present invention.

The lever 184 may rotate about an axis 185 formed by a bolt 183 and a shaft 185 that may extend therefrom, as illustrated in further detail in FIG. 16. The shaft 185 may be disposed across the entirety of the width of the main body portion 152. As the lever rotates upwardly, rotatable arm 186, which may be interlocked with shaft 185 at a first end thereof, may also rotate, moving pin 187, which may be disposed at or near a second end thereof, through slot 188. The pin 187 may be disposed through teeth 182 and may raise and lower teeth 182 as the pin 187 travels through slot 188. Teeth 182 may comprise a rack of several plates having grating engaging means, as illustrated in FIG. 14, a bottom view of the wheel chock apparatus 150 with teeth 182 engaging grating 191. Moreover, FIGS. 13 and 14 illustrate teeth extended downwardly and engaging the grating 191, thereby locking the wheel chock apparatus 150 in place. As further shown in FIG. 16, bolt 183 and shaft 185, forming axis of rotation 181, may interlock with gear 189 that may engage lever 184 causing rotatable arm 186 to rotate when the lever is pulled upwardly or downwardly. The pin 187, moving within slot may thus move the teeth 182 upwardly or downwardly, respectively.

Figure 15:
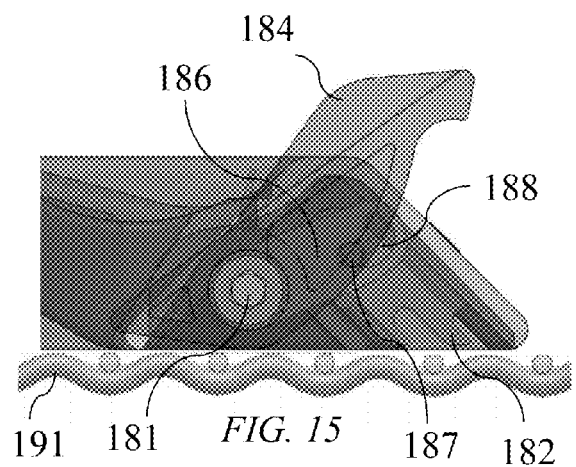
FIG. 15 illustrates a side phantom view of a wheel chock apparatus on a grating in a disengaged configuration in an embodiment of the present invention.

FIG. 15 illustrates the lever rotating upwardly, retracting teeth 182 away from grating 191, thereby disengaging teeth 182 from the grating 191. As illustrated, rotating lever 184 upwardly causes plate 186 to also rotate upwardly, causing pin 187 to travel through slot 188. The generally curved shape of the slot 188 causes the pin 187 to lock into the down position, as illustrated in FIG. 13, preventing accidental movement of the teeth 182 upwardly unless pulled by the lever 184. Thus, if the teeth 182 get bumped, jostled, or otherwise disturbed when in the down, locked position, the teeth remain extended downwardly. Thus, in a preferred embodiment, only the step of rotating the lever 186 upwardly may disengage the teeth 182 from the grating 191.

Referring now to FIG. 16, a bottom view of the wheel chock apparatus 150 is illustrated. As shown, lever 184 may be disposed on a side of the wheel chock apparatus, and shaft 185 may traverse through the wheel chock apparatus main body portion 152 from one side to the other side, connected to bolts 183 on either side of the main body portion 152. Moreover, pin 187 may also traverse the wheel chock apparatus main body portion 152 from one side to the other side thereof, thereby engaging the plurality of teeth 182 for extending and retracting the same from one end of the wheel chock apparatus 150 to the other when the pin moves in the slot of the plate 186.

Figure 17:
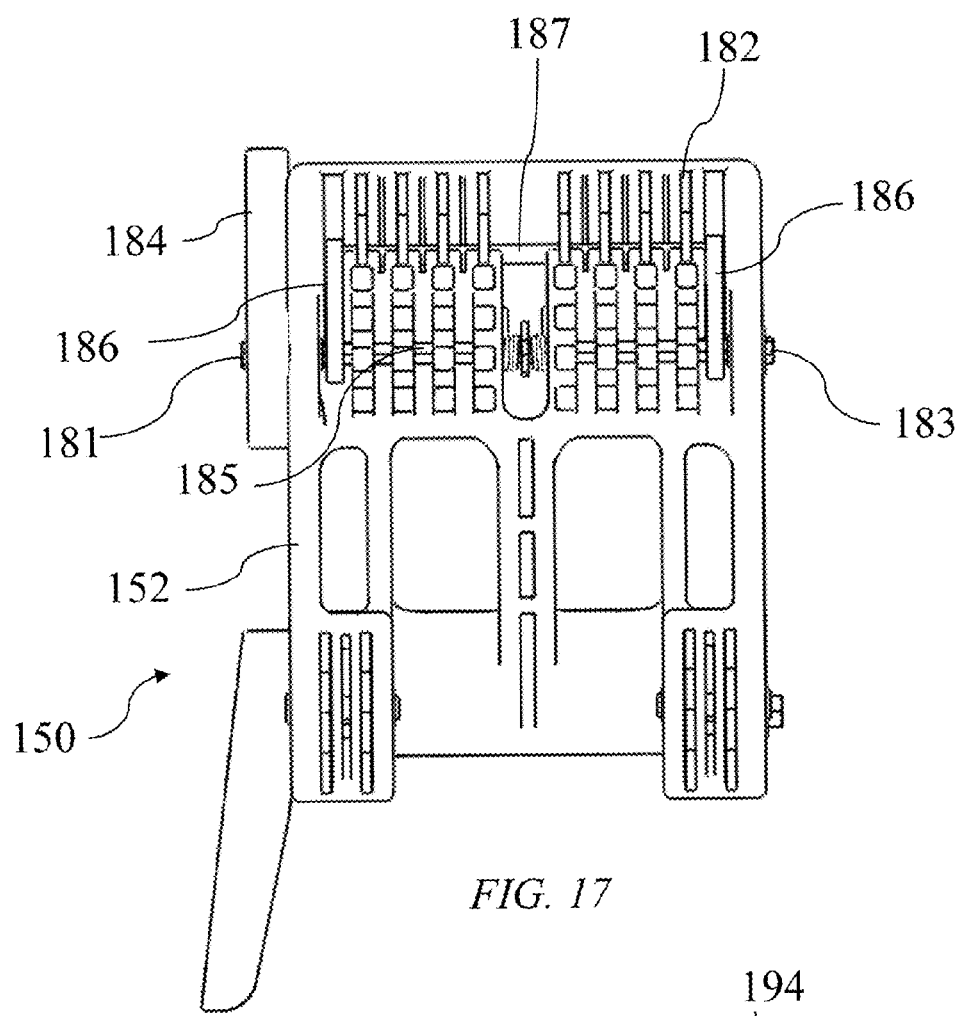
FIG. 17 illustrates a bottom view of a wheel chock apparatus in an embodiment of the present invention.
Figure 18:
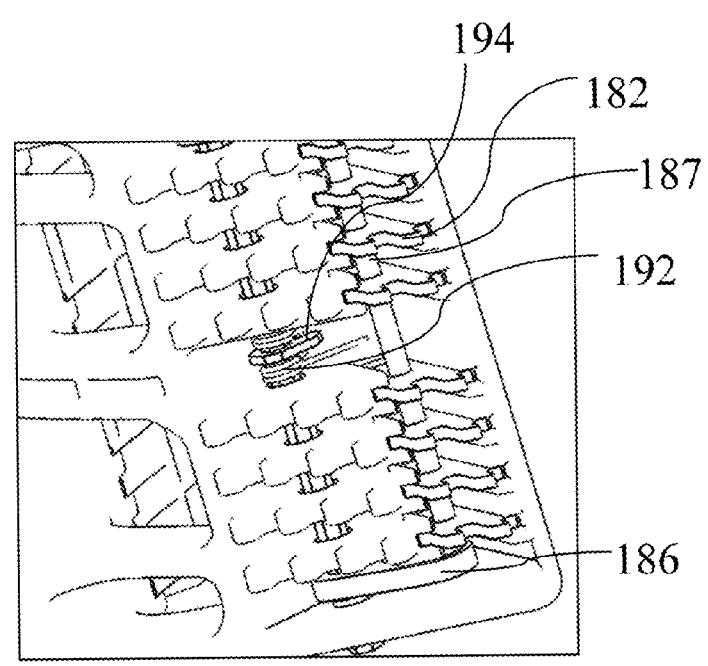
FIG. 18 illustrates a close-up bottom view of a wheel chock apparatus in an embodiment of the present invention.

In a preferred embodiment, the lever 184 may be biased downwardly so that the teeth are biased to an extended configuration via torsion spring 192, which is illustrated in FIGS. 17 and 18. The torsion spring 192 may engage the main body portion 152 of the wheel chock apparatus at one ends of the torsion spring. Further, the torsion spring 192 may engage a torsion spring capture plate 194 within the main body portion 152 of the wheel chock apparatus 150 biasing the lever 184 downwardly. Pulling upwardly on the lever 184, as shown in FIG. 15, turns the torsion spring capture plate 194 that, in turn, winds the torsion spring 192 such that releasing the lever 184 releases the torsion spring 192, rotating the lever 184 downwardly. Thus, as the torsion spring 192 biases the lever downwardly, the teeth 182 are further biased in an extended position, and further the curve of the slot 188 locks the teeth in an extended position unless the lever 184 is pulled upwardly, as noted below. This provides a further security element to the wheel chock apparatus, in that the wheel chock apparatus 150 may be biased to lock against the grating 191, thereby minimizing or preventing accidental release of the wheel chock apparatus 150 from the grating 191, especially during transport thereof in an auto-rack railcar.

Moreover, when not in use, wheel chock apparatuses are typically stored on a storage plate, which are typically disposed on a wall of the auto-rack railcar or in another storage location. The storage plate contains rods that may mimic a grating and the wheel chock apparatuses may lock thereto. The bias of the teeth into a locking, extended position may further aid in storing the wheel chock apparatuses on a wheel chock storage plate.

Figure 19A:
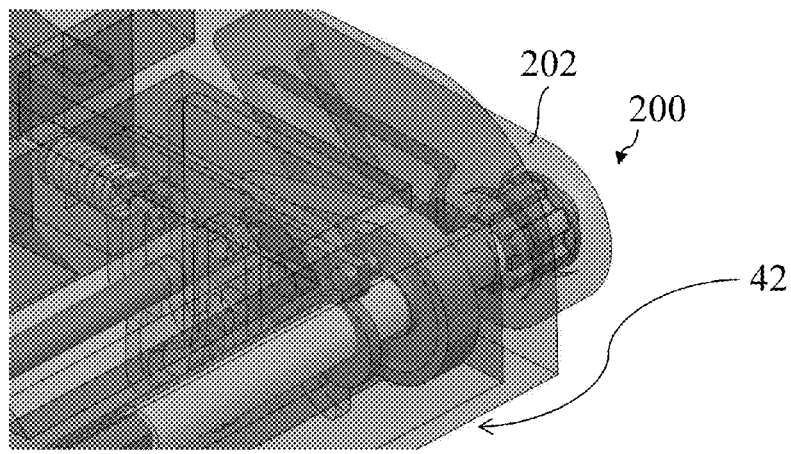
FIGS. 19A-19B illustrate a perspective phantom view of a teeth engaging mechanism in an embodiment of the present invention.
Figure 19B:
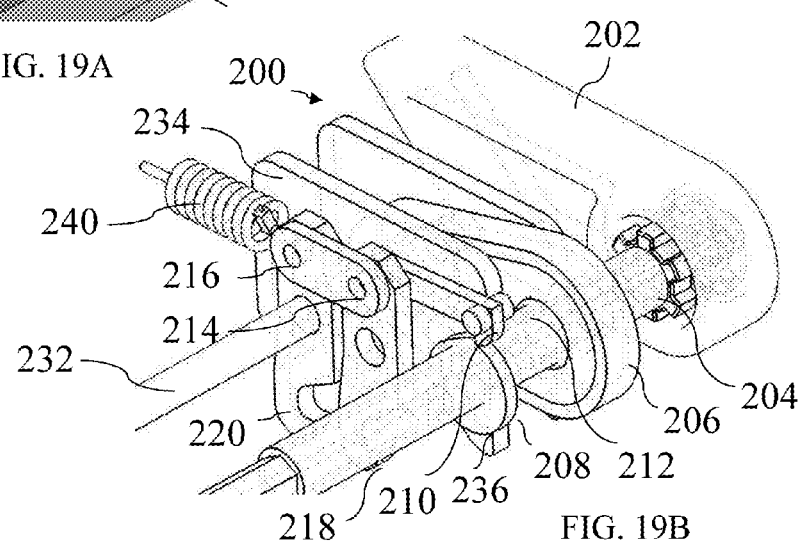

In an embodiment of the present invention, illustrated in FIGS. 19A-23E, an alternate teeth-engaging mechanism 200 is illustrated and disclosed herein. The teeth-engaging mechanism 200 may extend and retract the rear engaging teeth 42 using a lever 202 that may be disposed on a side thereof for manual manipulation thereof. FIG. 19A illustrates a phantom view of the teeth-engaging mechanism 200 as disposed on the rear end 16 of the wheel chock apparatus 10. FIG. 19B illustrates a cut-away isometric view cleanly showing the teeth-engaging mechanism 200. In general, the teeth-engaging mechanism 200 lifts the rear engaging teeth 42 from the floor grating system 110 when the lever 202 is lifted. Alternatively, the teeth-engaging mechanism 200 may be utilized to engage and disengage from a storage plate that may be used to store the wheel chock apparatus 10 when not in use.

More specifically, when the lever 202 is lifted and rotates about axis 204 a plurality of simultaneous parts are deployed and moved. Lifting of the lever 202 causes shaft 204 to rotate, which may cause arm 206 to also rotate and lift, and may also cause cam 208 to rotate.

Cam 208 may have a tooth 210 that may engage a hook follower 212. As cam 208 rotates clockwise (when viewing FIG. 19B), the tooth 210 may pull the hook follower 212, thereby pulling teeth levers 214, 216, causing teeth 218, 220, respectively on opposite ends of the teeth levers 214, 216, to rotate forwardly (relative to the wheel chock apparatus 10) to disengage the teeth 218, 220 from lateral bars 114 on the floor grating system 110. It should be noted that teeth levers 214, 216 may be linked together by a member (not shown) so as to act in concert together when teeth lever 216 is pulled by hook follower 212.

Simultaneously, as the shaft 204 turns with the lifting of the lever 202, the arm 206 may also rotate. A circular slot 230 within the arm 206 may move a rod 232 which may be linked to plates 234, each having a plurality of vertically-disposed teeth 236 on a bottom thereof for engaging the floor grating system 110. When the lever 202 is lifted sufficiently, the arm 206 may engage the bar 232 within the circular slot 230, thereby raising the plates 234. The plates 234 may further be linked to the teeth levers 214, 216. When the plates 234 rise as the lever 202 is lifted, the plurality of teeth 236 thereunder, as well as the teeth levers 214, 216, may also be lifted away from the floor grating system 110, disengaging the teeth 218, 220 and 236 from the floor grating system 110.

Figure 20:
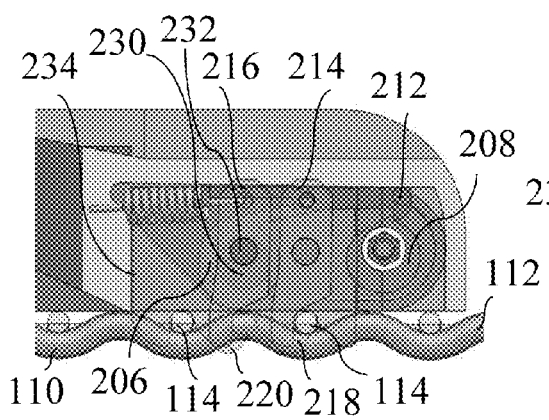
FIG. 20 illustrates a side phantom view of a teeth-engaging mechanism engaged to a floor grating system in an embodiment of the present invention.
Figure 21:
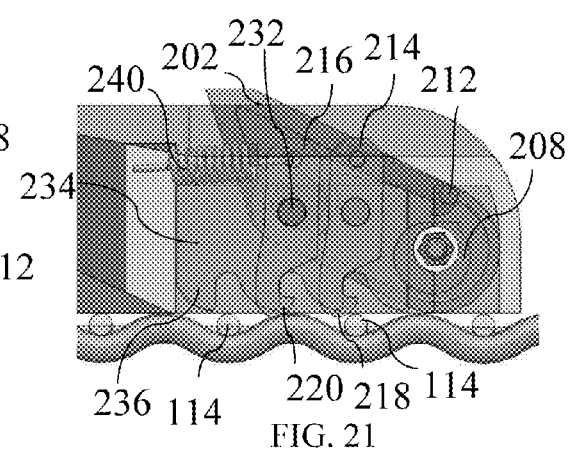
FIG. 21 illustrates a side phantom view of a teeth-engaging mechanism disengaged from a floor grating system in an embodiment of the present invention.
Figures 22A, 22B, 22C, 22D, 22E:
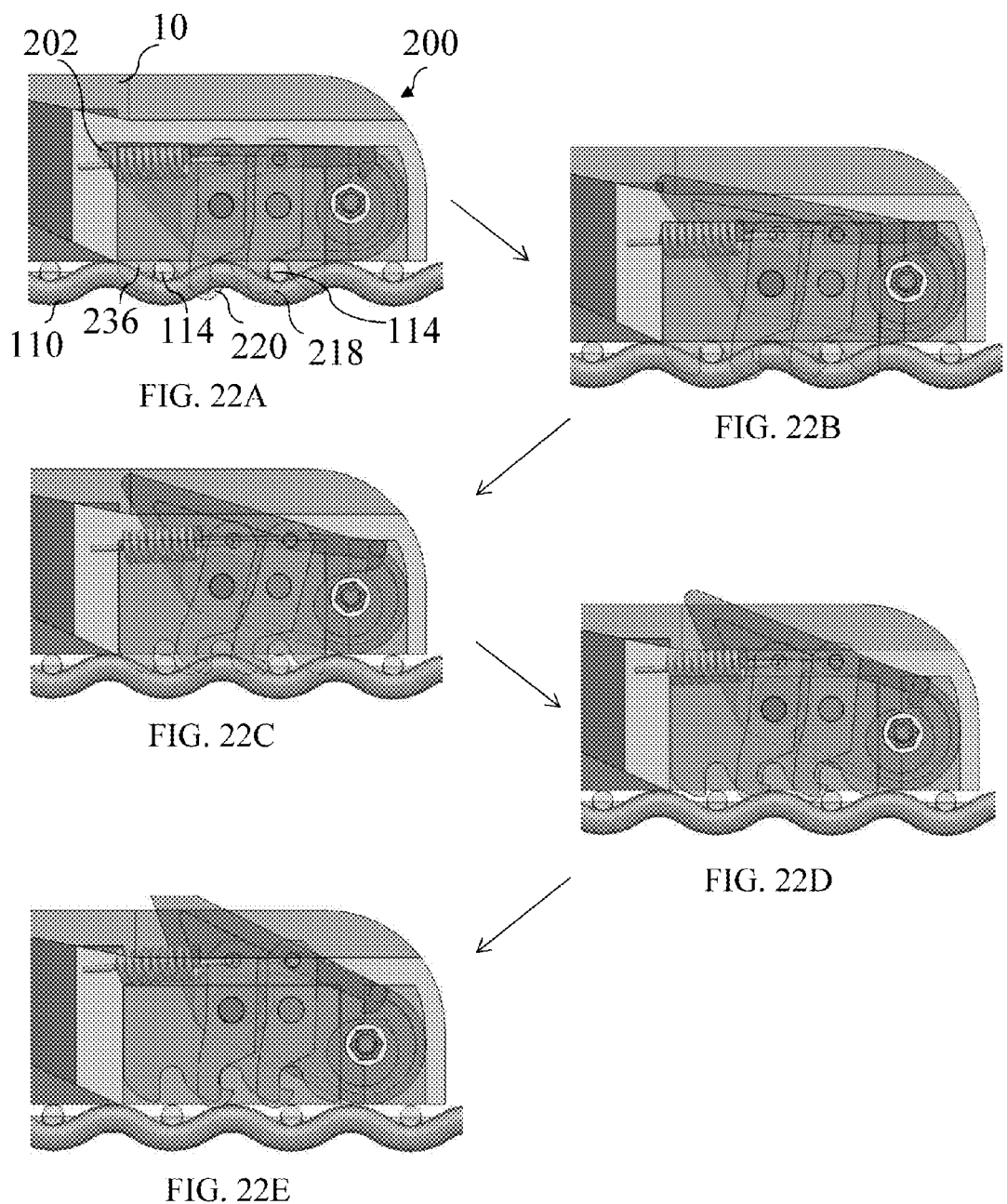
FIGS. 22A-22E illustrate a method of disengaging a teeth-engaging mechanism from a floor grating system in an embodiment of the present invention.

FIG. 20 illustrates the lever 202 in a down position and the teeth 218, 220 from teeth levers 214, 216 and the teeth 236 engaged to lateral bars 114 of a floor grating system 110. Likewise, FIG. 21 illustrates the lever 202 in an up position and the teeth 218, 220 from teeth levers 214, 216 and the teeth 236 disengaged from the lateral bars 114 of the floor grating system 110. Spring 240 ensures that the teeth levers 214, 216 (which may be linked together, as noted above) return to their original vertical positions after being pulled and rotated due to the movement of the cam 208. The spring 240 may also bias the plates 234 downwardly to engage the teeth 236 to the floor grating system 110. FIGS. 22A-22E illustrate a step-by-step method showing the teeth-engaging mechanism 200 disengaging the teeth 214, 216 and 236 from the lateral bars 114 of the floor grating system 110 as the lever moves from a fully lowered position (shown in FIG. 22A) to a fully raised position (shown in FIG. 22E).

Figures 23A, 23B, 23C, 23D, 23E:
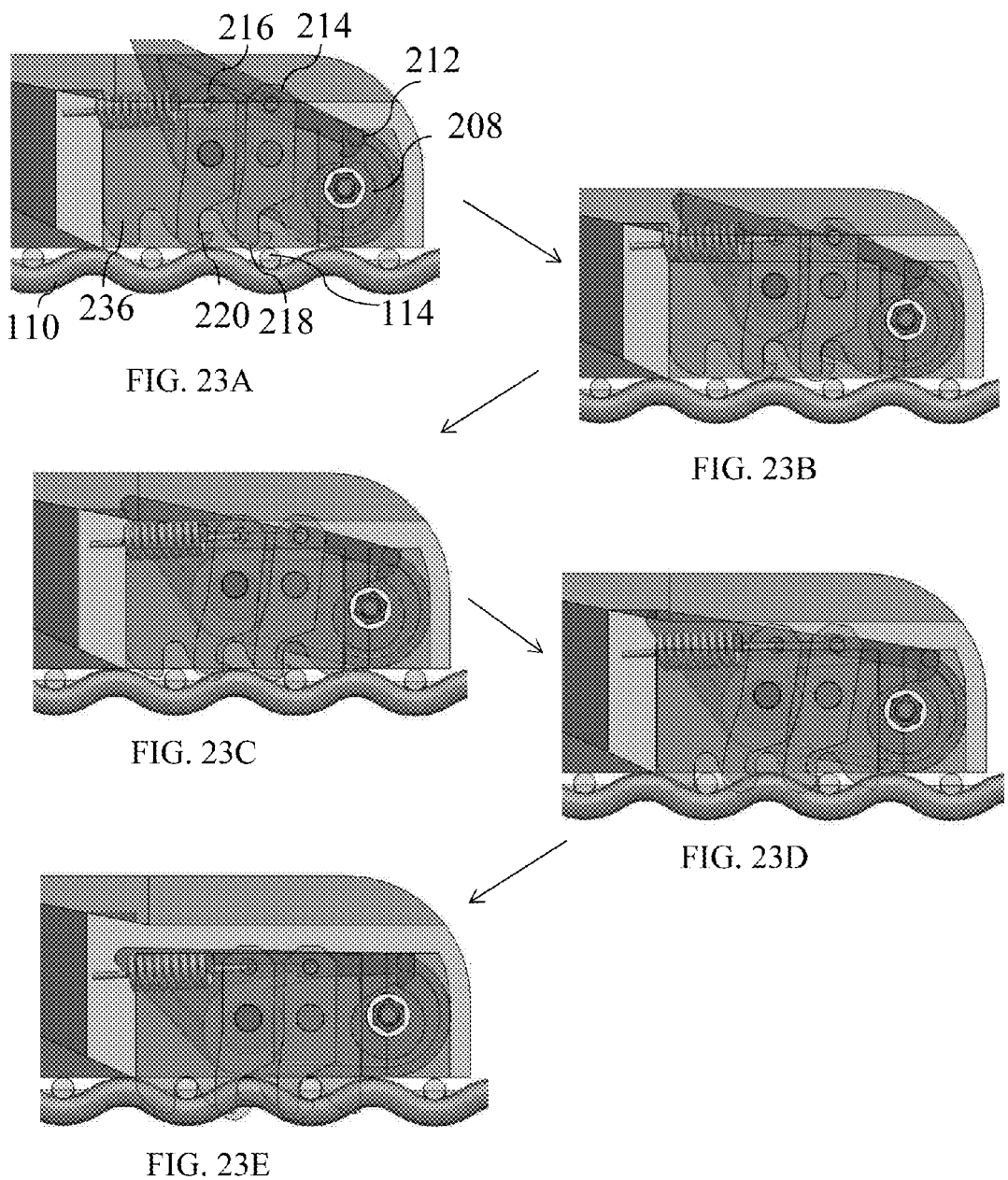
FIGS. 23A-23E illustrate a method of engaging a teeth-engaging mechanism to a floor grating system in an embodiment of the present invention.

Likewise, FIGS. 23A-23E illustrate the teeth-engaging mechanism 200 moving from a disengaged position to an engaged position. Specifically, as the lever 202 is lowered from a fully raised position (illustrated in FIG. 23A), the carriage 234 moves the teeth levers 214, 216, and the teeth 236 downwardly. Rounded portions on the bottoms of the teeth 218, 220 may follow the rounded surface of the lateral bars 114, pushing against spring 240. Once the teeth 218, 220 are lowered sufficiently via the lever 202, the spring 240 may cause the teeth 218, 220 to engage under the lateral bars 114 of the floor grating system. The cam 208 may further engage hook 212, effectively resetting the system, as illustrated in FIG. 23E so that the cam 208 may move the hook 212 when lever 202 is pulled when the user wishes to disengage the wheel chock apparatus 10 from the floor grating system 110.

A benefit of the alternate teeth-engaging mechanism 200, as described above, is that the teeth 218, 220, 236 may engage the floor grating system 110 or a storage plate merely by placing the wheel chock apparatus 10 into position on the floor grating system 110 or storage plate and pushing downwardly, without requiring a user to rotate the handle 202.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

The invention claimed is:

1. A wheel chock apparatus for holding a vehicle tire when disposed adjacent to the vehicle tire in an auto-rack railcar comprising:
    a main body portion comprising a front end, a rear end, a first side and a second side, the front end disposed adjacent a vehicle tire when in use;
    a ramp disposed on the front end for contacting a vehicle tire;
    a lateral restraint disposed on one of the first and second sides, the lateral restraint extending away from the main body portion at the front end of the main body portion;
    a first set of teeth for engaging a grating, the first set of teeth disposed beneath the front end of the main body portion;
    a second set of teeth for engaging the grating, the second set of teeth disposed beneath the rear end of the main body portion, the second set of teeth having a retracted position and an extended position; and
    a lever disposed on one of the first and second sides, the lever linked to the second set of teeth, wherein movement of the lever moves the second set of teeth from the retracted position to the extended position;
    a pin disposed from the first side to the second side of the main body portion, wherein the second set of teeth are engaged with the pin;
    a plate linking the lever to the pin;
    a slot disposed within the plate, the pin freely movable through the slot, wherein the pin moves through the slot upon movement of the lever and the plate, thereby moving the second set of teeth from the retracted position to the extended position.

2. The wheel chock apparatus of claim 1 wherein the lateral restraint is rotatable about an axis, and further wherein the lateral restraint has a retracted position and an extended position.

3. The wheel chock apparatus of claim 1 wherein the first set of teeth are fixed in an extended position.

4. The wheel chock apparatus of claim 1 further comprising:
    an axis disposed from the first side to the second side of the main body portion, wherein the lever rotates about the axis.

5. The wheel chock apparatus of claim 1 wherein the slot is curved.

6. The wheel chock apparatus of claim 1 wherein the second set of teeth is biased into the extended position.

7. The wheel chock apparatus of claim 6 further comprising:
    a torsion spring disposed on the axis for biasing the second set of teeth into an extended position.

8. The wheel chock apparatus of claim 7 wherein the torsion spring is connected to the axis and winds upon rotating of the axis, an end of the torsion spring contacting a torsion spring capture plate.

9. The wheel chock apparatus of claim 8 wherein the torsion spring capture plate is connected to the wheel chock apparatus main body portion.

10. The wheel chock apparatus of claim 1 wherein the lateral restraint and the lever are disposed on the same side of the main body portion.

11. The wheel chock apparatus of claim 1 further comprising a second lateral restraint disposed on an opposite side of the main body portion from the first lateral restraint.

12. A method of using the wheel chock apparatus of claim 1 comprising the steps of:
    disposing a vehicle comprising at least one vehicle tire having tire tread on a grating within an auto-rack railcar;
    placing the wheel chock apparatus of claim 1 adjacent the vehicle tire and contacting the ramp to the tire tread;
    engaging the first set of teeth beneath the first end of the main body portion to the grating;
    moving the lever to extend the second set of teeth; and
    engaging the second set of teeth with the grating.

13. The method of claim 12 further comprising the step of:
    moving the lever to retract the second set of teeth prior to placing the wheel chock apparatus of claim 1 adjacent the vehicle tire and contacting the ramp to the tire tread.

14. The method of claim 12 further comprising the step of:
    locking the second set of teeth into the extended position when engaging the second set of teeth with the grating.

15. The wheel chock apparatus of claim 1 wherein the main body portion comprises a handle comprising a bar running longitudinally between the front end and the rear end of the main body portion at a midpoint between the first side and the second side and having a first aperture between the handle and the first side and a second aperture between the handle and the second side, wherein the first and second apertures are configured to allow a user's hand to grasp the handle.

16. A wheel chock apparatus for holding a vehicle tire when disposed adjacent to the vehicle tire in an auto-rack railcar comprising:

a main body portion comprising a front end, a rear end, a first side and a second side, the front end disposed adjacent a vehicle tire when in use;

a ramp disposed on the front end for contacting a vehicle tire;

a lateral restraint disposed on one of the first and second sides, the lateral restraint extending away from the main body portion at the front end of the main body portion;

a first set of teeth for engaging a grating, the first set of teeth disposed beneath the front end of the main body portion;

a second set of teeth for engaging the grating, the second set of teeth having an axis disposed beneath the rear end of the main body portion, the second set of teeth having a retracted position and an extended position;

a lever disposed on one of the first and second sides, the lever linked to the second set of teeth via an axis disposed from the first side to the second side of the main body portion, wherein the lever rotates about the axis, wherein movement of the lever moves the second set of teeth from the retracted position to the extended position, wherein the second set of teeth is biased into the extended position via a torsion spring disposed on the axis.

17. The wheel chock apparatus of claim 16 wherein the lateral restraint is rotatable about an axis, and further wherein the lateral restraint has a retracted position and an extended position.

18. The wheel chock apparatus of claim 16 wherein the first set of teeth are fixed in an extended position.

19. The wheel chock apparatus of claim 16 further comprising:
an axis disposed from the first side to the second side of the main body portion, wherein the lever rotates about the axis.

20. The wheel chock apparatus of claim 16 further comprising:
a pin disposed from the first side to the second side of the main body portion, wherein the second set of teeth are engaged with the pin, wherein movement of the pin moves the second set of teeth from the retracted position to the extended position, wherein the lever is linked to the pin.

21. The wheel chock apparatus of claim 20 further comprising:
a plate linking the lever to the pin, wherein movement of the lever moves the plate, thereby moving the pin, thereby moving the second set of teeth from the retracted position to the extended position.

22. The wheel chock apparatus of claim 21 further comprising:
a slot disposed within the plate, the pin freely movable through the slot, wherein the pin moves through the slot upon movement of the lever and the plate, thereby moving the second set of teeth from the retracted position to the extended position.

23. The wheel chock apparatus of claim 22 wherein the slot is curved.

24. The wheel chock apparatus of claim 16 wherein the torsion spring is connected to the axis and winds upon rotating of the axis, an end of the torsion spring contacting a torsion spring capture plate.

25. The wheel chock apparatus of claim 24 wherein the torsion spring capture plate is connected to the wheel chock apparatus main body portion.

26. The wheel chock apparatus of claim 16 wherein the lateral restraint and the lever are disposed on the same side of the main body portion.

27. The wheel chock apparatus of claim 16 further comprising a second lateral restraint disposed on an opposite side of the main body portion from the first lateral restraint.

28. A method of using the wheel chock apparatus of claim 16 comprising the steps of:
disposing a vehicle comprising at least one vehicle tire having tire tread on a grating within an auto-rack railcar;
placing the wheel chock apparatus adjacent the vehicle tire and contacting the ramp to the tire tread;
engaging the first set of teeth beneath the first end of the main body portion to the grating;
moving the lever to extend the second set of teeth; and
engaging the second set of teeth with the grating.

29. The method of claim 28 further comprising the step of:
moving the lever to retract the second set of teeth prior to placing the wheel chock apparatus of claim 1 adjacent the vehicle tire and contacting the ramp to the tire tread.

30. The method of claim 28 further comprising the step of:
locking the second set of teeth into the extended position when engaging the second set of teeth with the grating.

31. A method of using the wheel chock apparatus of claim 22 comprising the steps of:
disposing a vehicle comprising at least one vehicle tire having tire tread on a grating within an auto-rack railcar;
placing the wheel chock apparatus of claim 1 adjacent the vehicle tire and contacting the ramp to the tire tread;
engaging the first set of teeth beneath the first end of the main body portion to the grating;
moving the lever to extend the second set of teeth; and
engaging the second set of teeth with the grating.

32. The method of claim 31 further comprising the step of:
moving the lever to retract the second set of teeth prior to placing the wheel chock apparatus adjacent the vehicle tire and contacting the ramp to the tire tread.

33. The wheel chock apparatus of claim 16 wherein the main body portion comprises a handle comprising a bar running longitudinally between the front end and the rear end of the main body portion at a midpoint between the first side and the second side and having a first aperture between the handle and the first side and a second aperture between the handle and the second side, wherein the first and second apertures are configured to allow a user's hand to grasp the handle.

* * * * *